US008875568B2

(12) United States Patent
Argentieri

(10) Patent No.: US 8,875,568 B2
(45) Date of Patent: Nov. 4, 2014

(54) RELATIVE WIND DISPLAY AND LANDING AID

(75) Inventor: Michael A. Argentieri, West Orange, NJ (US)

(73) Assignee: Argen Aviation, Inc., West Orange, NJ (US)

( * ) Notice: Subject to any disclaimer, the term of this patent is extended or adjusted under 35 U.S.C. 154(b) by 120 days.

(21) Appl. No.: 13/523,250

(22) Filed: Jun. 14, 2012

(65) Prior Publication Data

US 2013/0333462 A1 Dec. 19, 2013

(51) Int. Cl.
*G01P 13/00* (2006.01)

(52) U.S. Cl.
USPC ........................................................ 73/170.02

(58) Field of Classification Search
USPC ........................................ 73/170.02–170.05
See application file for complete search history.

(56) References Cited

U.S. PATENT DOCUMENTS

| | | | |
|---|---|---|---|
| 3,593,259 A | 7/1971 | Stormo | |
| 3,593,260 A | 7/1971 | Stormo | |
| 3,882,721 A * | 5/1975 | Neary et al. | 73/170.02 |
| 4,672,846 A * | 6/1987 | LeBlond et al. | 73/180 |
| 5,438,865 A * | 8/1995 | Greene | 73/180 |
| 6,342,846 B1 * | 1/2002 | Argentieri | 340/977 |
| 6,612,166 B2 * | 9/2003 | Golly et al. | 73/170.02 |
| 6,817,240 B2 * | 11/2004 | Collot et al. | 73/170.02 |
| 6,985,091 B2 | 1/2006 | Price | |
| 7,605,774 B1 | 10/2009 | Brandt et al. | |
| 7,925,391 B2 | 4/2011 | Sanders-Reed | |
| 2002/0166375 A1 * | 11/2002 | Cronin et al. | 73/170.02 |
| 2007/0295078 A1 * | 12/2007 | Greene | 73/170.02 |
| 2008/0180351 A1 | 7/2008 | He | |
| 2012/0137765 A1 * | 6/2012 | Wagner et al. | 73/170.02 |

* cited by examiner

*Primary Examiner* — Andre Allen
(74) *Attorney, Agent, or Firm* — Howard IP Law Group, PC

(57) ABSTRACT

A system for displaying information obtained along the direction of flight of an aircraft is provided. The system includes a vane assembly pivotally mounted to the aircraft having a sensor mounted thereto. The vane comprises a pointing axis configured to continuously align with the direction of the flight path of the aircraft. A display device is operatively connected to the output of the sensor for providing a display along the actual flight path of the aircraft.

20 Claims, 11 Drawing Sheets

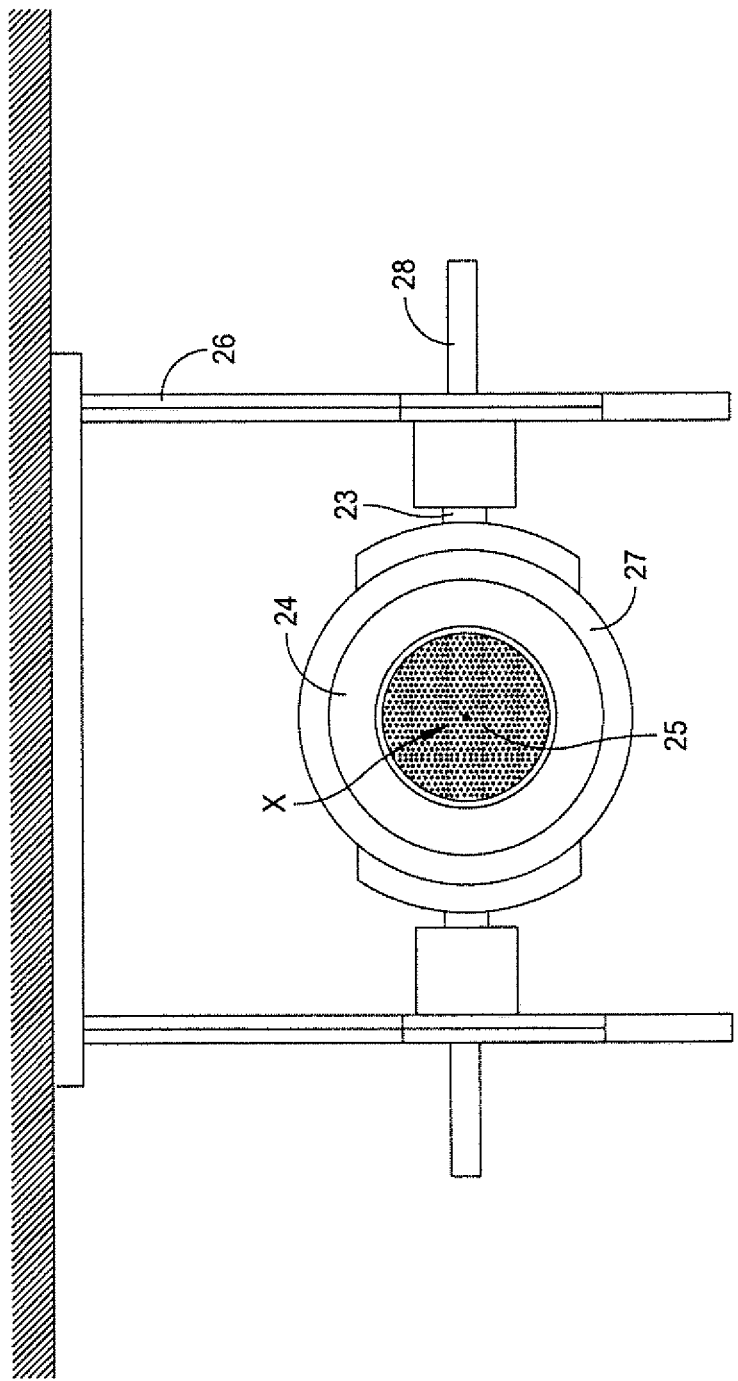

RELATIVE WIND DISPLAY AND LANDING AID

FIELD OF THE INVENTION

The present disclosure relates to aircraft cockpit display systems and landing aids, and more specifically, to systems for displaying the actual flight path of an aircraft along the direction of the relative wind vector.

BACKGROUND

Aircraft flight is dependent on the generation of lift resulting from the movement of an airfoil (e.g. a wing) through the air. The generation of lift is dependent upon the angle of attack of the wing, which is generally defined as the angle between an airfoil's chord line and the relative wind vector, or direction of flight. During various aircraft maneuvers, including landing operations, the angle of attack of a wing may increase in order to provide sufficient lift as airspeeds decrease. As such, the direction of a pilot's view out of, for example, the windscreen of the aircraft, may not be representative of the aircraft's actual flight path. In instances of significant angles of attack, it can be difficult to judge an aircraft's actual flight path, including the touch-down point of the aircraft during landing operations. This can be particularly problematic for less experienced pilots, or students learning to fly.

It would be advantageous to have a system which displays the flight path of an aircraft to a user, independent of the aircraft's angle of attack.

SUMMARY

According to one embodiment of the present disclosure, a sensor assembly for collecting data indicative of the flight path of an aircraft is provided. The assembly includes a frame configured to attach to the aircraft. A vane is pivotally attached to the frame, with a sensor mounted thereto. The vane defines a pointing axis which aligns with the direction of the flight path of the aircraft via the force of the relative wind acting thereon. The sensor is arranged on the vane such that, in flight, its sensing axis is aligned in parallel with the pointing axis of the vane. In this way, the sensing axis is also aligned with the actual flight path (relative wind) of the aircraft.

According to another embodiment of the present disclosure, a system for displaying information indicative of the direction of flight of an aircraft is provided. The system includes a vane assembly pivotally mounted to the aircraft. The vane assembly defines a pointing axis configured to align with the direction of the flight path of the aircraft. A sensor is mounted to the vane assembly. A display device is operatively connected to the output of the sensor for providing a visual indication along the actual flight path of the aircraft.

BRIEF DESCRIPTION OF THE DRAWINGS

FIGS. 3A-3D are perspective, side, top and front views, respectively, of a vane-mounted sensor arrangement according to an embodiment of the present disclosure.

DETAILED DESCRIPTION

Figure 1:
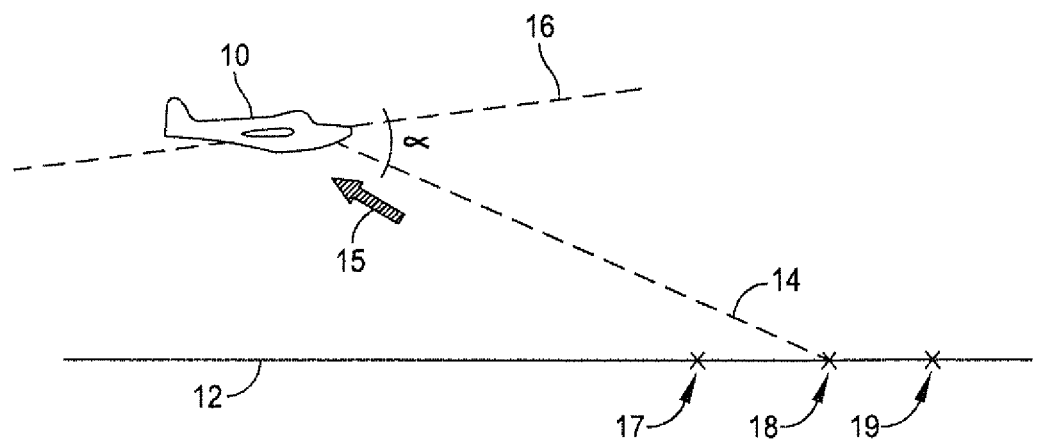
FIG. 1 is a diagram illustrating the angle of attack of an aircraft in flight.

It is to be understood that the figures and descriptions of the present invention have been simplified to illustrate elements that are relevant for a clear understanding of the present invention, while eliminating, for purposes of clarity, many other elements found in, for example, aircraft, video and wireless communication systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Referring generally to FIG. 1, a depiction of an aircraft 10 approaching a runway 12 is provided. Aircraft 10 is progressing along an actual flight path 14 generating a relative wind vector 15 with respect thereto. The angle of attack of aircraft 10 is defined between this wind vector 15 (or flight path 14) and a chord line 16 defined by the wing of aircraft 10. As shown in the figure, aircraft 10 is on course to touch-down generally at point 18. It should be noted that this touch-down point may not be visible, or easily identifiable by the aircraft's pilot, as a result of the angle of attack of the aircraft as it descends toward runway 12. Accordingly, a pilot may face difficulty when attempting to accurately place the aircraft onto the runway.

Embodiments of the present disclosure include systems for providing a visualization of the true aircraft flight path to a pilot. In the context of a landing operation, for example, a pilot may be provided with an accurate image of the touch-down point of the aircraft, independent of aircraft wing configuration, airspeed and angle of attack. Embodiments of the present disclosure include, for example, a free or pivotally mounted vane or airfoil attached to, for example, the wing of an aircraft. A sensory device, such as a video camera, may be fixedly arranged on or within the vane, such that in flight, the vane and camera are continuously aligned with the direction of the relative wind, and thus, in the direction of the actual flight path of the aircraft. A display may be provided for presenting the pilot with a visual image along this flight path.

In this way, during, for example landing operations, a pilot will be provided with a visualization of the approach path and actual touch-down point of the aircraft.

Figure 2A:
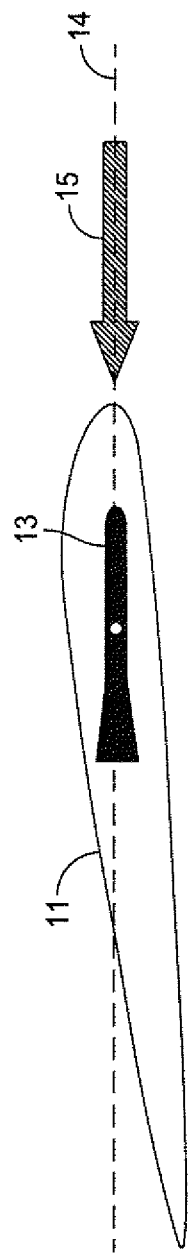
FIGS. 2A-2B are diagrams illustrating the function of a wing-mounted vane according to embodiments of the present disclosure.
Figure 2B:
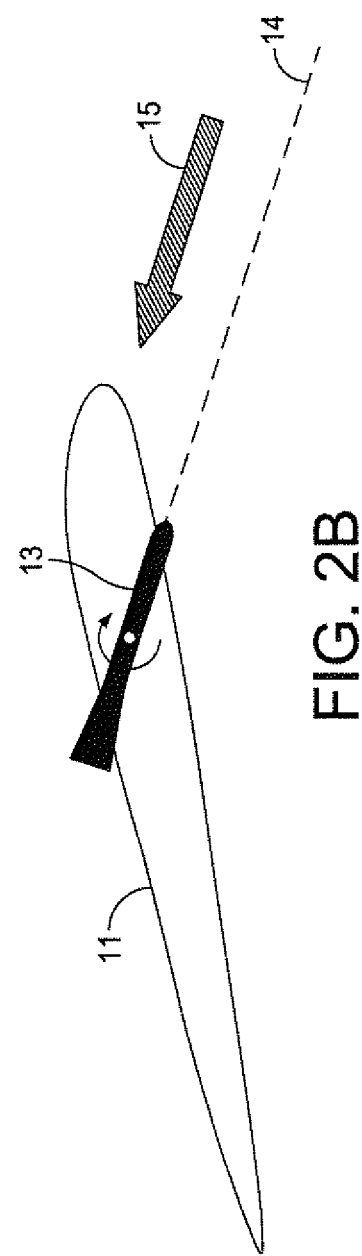
Figure 3A:
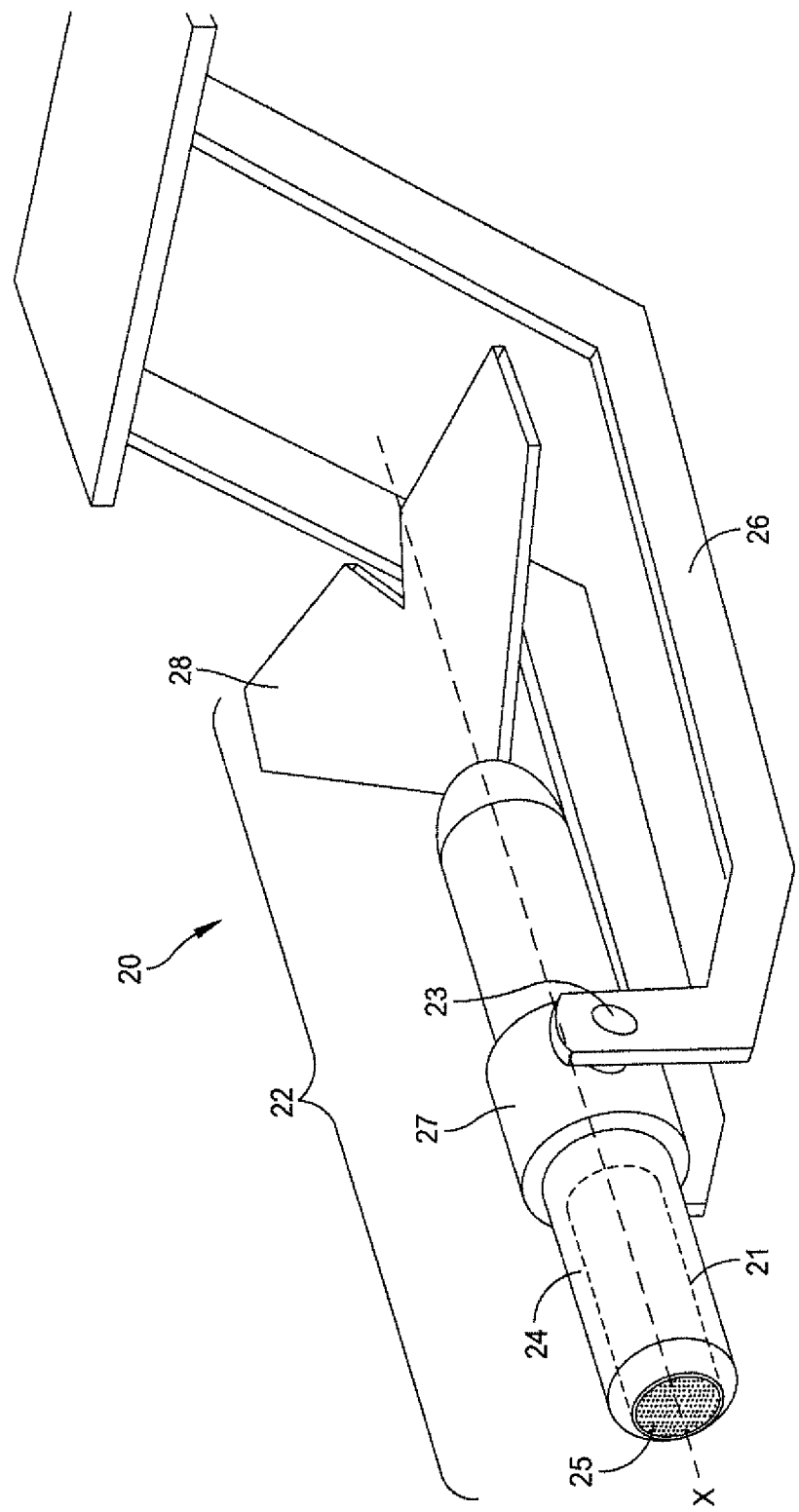
Figure 3B:
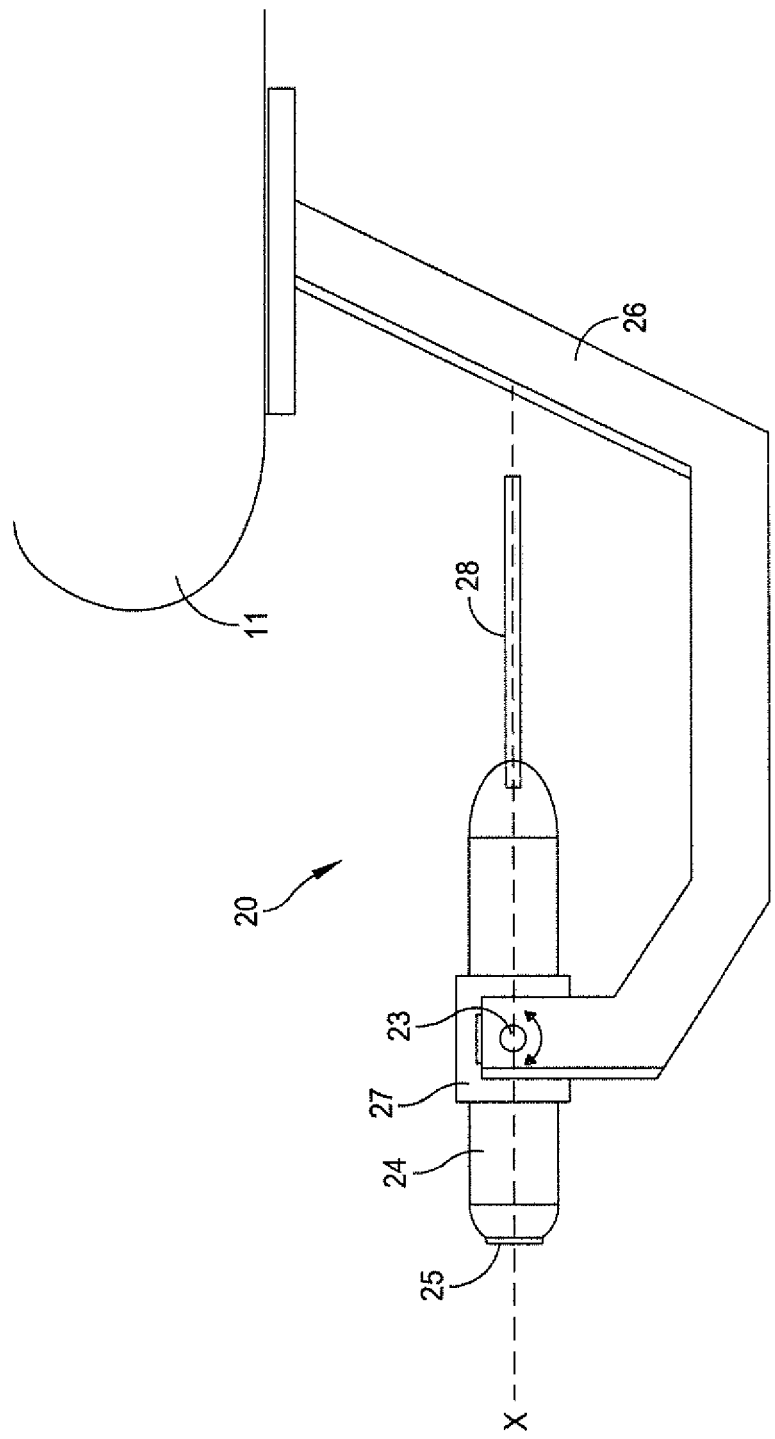
Figure 3C:
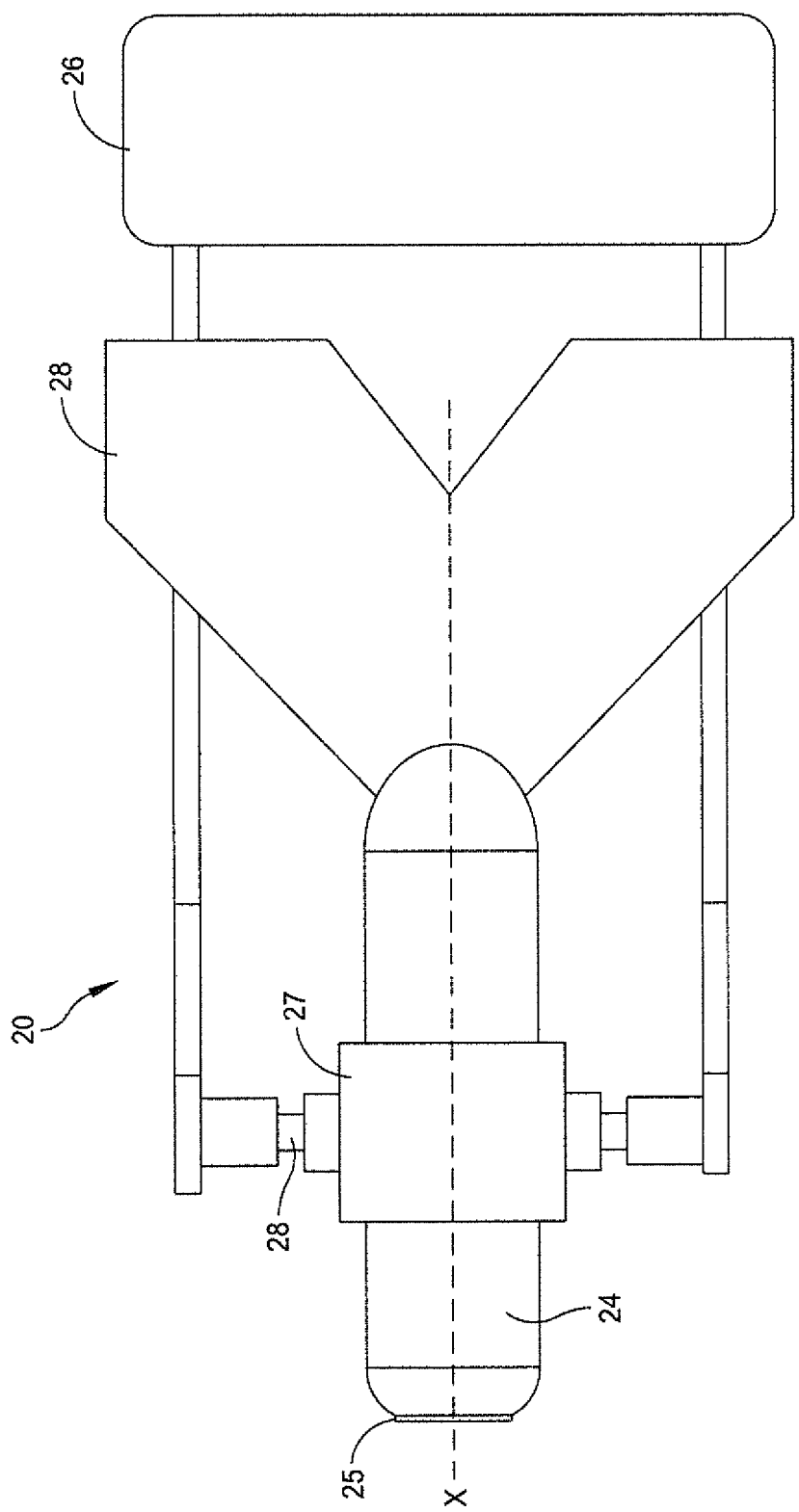

FIGS. 2A and 2B provide a visual representation of the functionality of a free or pivotally mounted vane according to embodiments of the present disclosure. Referring generally to FIG. 2A, a wing 11 of an aircraft in level flight is shown. As illustrated, flight path 14 of the aircraft is generally level, generating a corresponding level relative wind vector 15. A vane element 13 is pivotally or otherwise moveably mounted to wing 11 such that the force generated by relative wind vector 15 on vane 13 aligns vane 13 in the direction of flight path 14 of the aircraft. FIG. 2B illustrates the same pivotally mounted vane 13, wherein wing 11 is shown with an increased angle of attack (e.g. during a landing operation, or other low-speed flight). Despite this change in angle of attack, vane 13 remains aimed in the direction of relative wind 15, corresponding to flight path 14 of the aircraft.

Referring generally to FIGS. 3A-3D, systems of the present disclosure may utilize a similar vane arrangement for accurately displaying the actual flight path of an aircraft along the direction of the relative wind vector. In the illustrated embodiment, a sensor assembly 20 comprises a sensor 21 (e.g. an optical, video, infrared, or thermal camera), including a lens 25, arranged within a generally cylindrical housing 24. Housing 24, along with one or more airfoil elements 28, may comprise all or part of a wind vane arrangement 22. Housing 24 is pivotally connected to a support frame 26 configured to mount vane arrangement 22 to, for example, the wing or fuselage of an aircraft (i.e. in an area of the aircraft exposed to undisturbed airflow). In the exemplary embodiments, housing 24 is attached to frame 26 via a mounting collar 27, which comprises pivot points or axes 23 (e.g. axles or fasteners) for connecting with frame 26. Airfoil element(s) 28 aids in aligning a pointing axis of vane arrangement 22 in the direction of the relative wind during flight. More specifically, by exposing vane arrangement 22 to relatively "clean" air, its pointing axis will be urged by the relative wind into a direction parallel with the actual flight path of the aircraft.

Still referring to FIGS. 3A-3D, in the illustrated embodiment, sensor 21 and housing 24 are fixedly arranged coaxially along a common axis x, ensuring that the viewing area, or sensing axis, of the camera will remain in line with the relative wind/vane direction. It should be understood, however, that other embodiments may include a sensory device arranged, for example, on an external surface of an airfoil, housing or vane, without departing from the scope of the present invention. In these embodiments, the sensor and vane may be collimated (i.e. arranged in parallel). In any of these described embodiments, the pivoting axis 23 of the sensor may be arranged generally perpendicular with respect to sensor axis x.

In order to ensure accurate in flight operation of sensor assembly 20, it may be necessary to balance vane arrangement 22 with respect to frame 26 about its pivoting axis. A balanced arrangement ensures that the angle of the pointing axis of vane arrangement 22 will be dictated only by the direction of the relative wind, and not by any internal imbalances. With reference to the exemplary figures, this balancing may be achieved by slidably arranging housing 24 within mounting collar 27, such that the position of housing 24 relative to collar 27 may be altered along axis x until the assembly is balanced about pivoting axis 23. Moreover, housing 24 may be rotatably arranged within collar 27 so as to allow for aligning the camera's field of view (e.g. rotating the camera to vertical). Once balanced and aligned, housing 24 may be secured (e.g. clamped) to collar 27. Similarly, airfoil elements 28 may be rotatably mounted to housing 24, allowing for optimal alignment of these elements once mounted to the aircraft.

While a slideable collar and housing arrangement is shown, it should be noted that any suitable means to balance sensor assembly 20 to a mounting apparatus may be implemented without departing from the scope of the present invention.

It should be understood that embodiments of the disclosure may be mounted to suitable portions of the aircraft without departing from the scope of the present disclosure. In one embodiment, assembly 20 may be mounted to the underside of a wing (11, FIGS. 3B and 3D) and may extend forward into relatively undisturbed air. The housing may be configured to "see" relative wind, usually found ahead of the aircraft body and oriented generally forward looking. Moreover, while FIGS. 3A-3D illustrate an exemplary vane configuration, including an airfoil element arranged on housing 24 for achieving directional stability along the relative wind vector, it should be understood that this arrangement is provided only for exemplary purposes only, and other suitable designs or configurations may be implemented without departing from the scope of the present disclosure.

Figure 4:
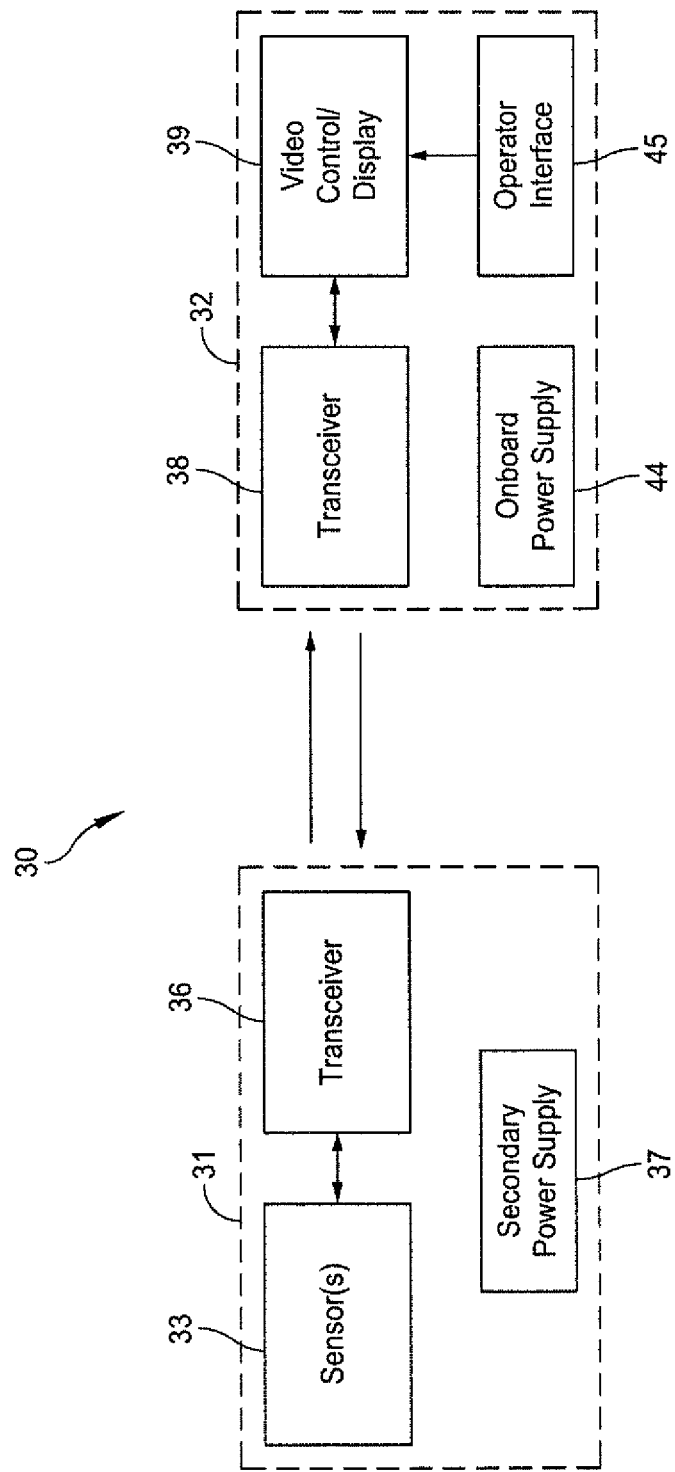
FIG. 4 is a schematic diagram of an exemplary sensor and display system according to an embodiment of the present disclosure.

Embodiments of the sensor assemblies described above may be implemented into a system for displaying captured data (e.g. an image) along the flight path of an aircraft. For example, FIG. 4 illustrates a flight path display system 30 including a subsystem 31 which may be incorporated into a movable sensor assembly, such as assembly 20 shown in FIGS. 3A-3D. Subsystem 31 includes at least one sensor 33, such as a video camera, for capturing an image along the actual flight path of an aircraft as set forth above. The output of sensor 33 may be provided to, for example, a transmitter or a transceiver, such as a radio frequency (RF) transceiver 36. RF transceiver 36 may be configured to wirelessly transmit data output from sensor 33 to a second subsystem 32. A power supply 37, such as a battery, may be provided for powering one or both of the sensor(s) and the transceiver, as well as any additional system components not illustrated for the purposes of clarity. It should be understood that all of these components may be arranged within the housing of the sensor assembly (e.g. housing 24 of FIGS. 3A-3D) and connected via wired or wireless connections to associated components.

Subsystem 32 may be located, for example, in the cockpit of the aircraft, and may comprise a corresponding receiver/transmitter arrangement, such as a second RF transceiver 38 responsive to RF transceiver 36 for receiving data (e.g. video data), or for transmitting signals for controlling sensor 33. Received data may be supplied to, for example, a video controller and/or a display device 39 (e.g. a monitor, "heads up" cockpit display, or projector system) for providing a real-time video display along the flight path of the aircraft.

It should be understood that additional components, such as an operator interface 45 for controlling various features of system 30 may also be provided. Further, subsystem 32 may be powered by, for example, the aircraft's power supply, or a separate power supply 44. Further still, while a wireless connection between subsystems 31,32 is shown, it should be understood that embodiments of the present disclosure may be implemented with wired connections.

Figure 5:
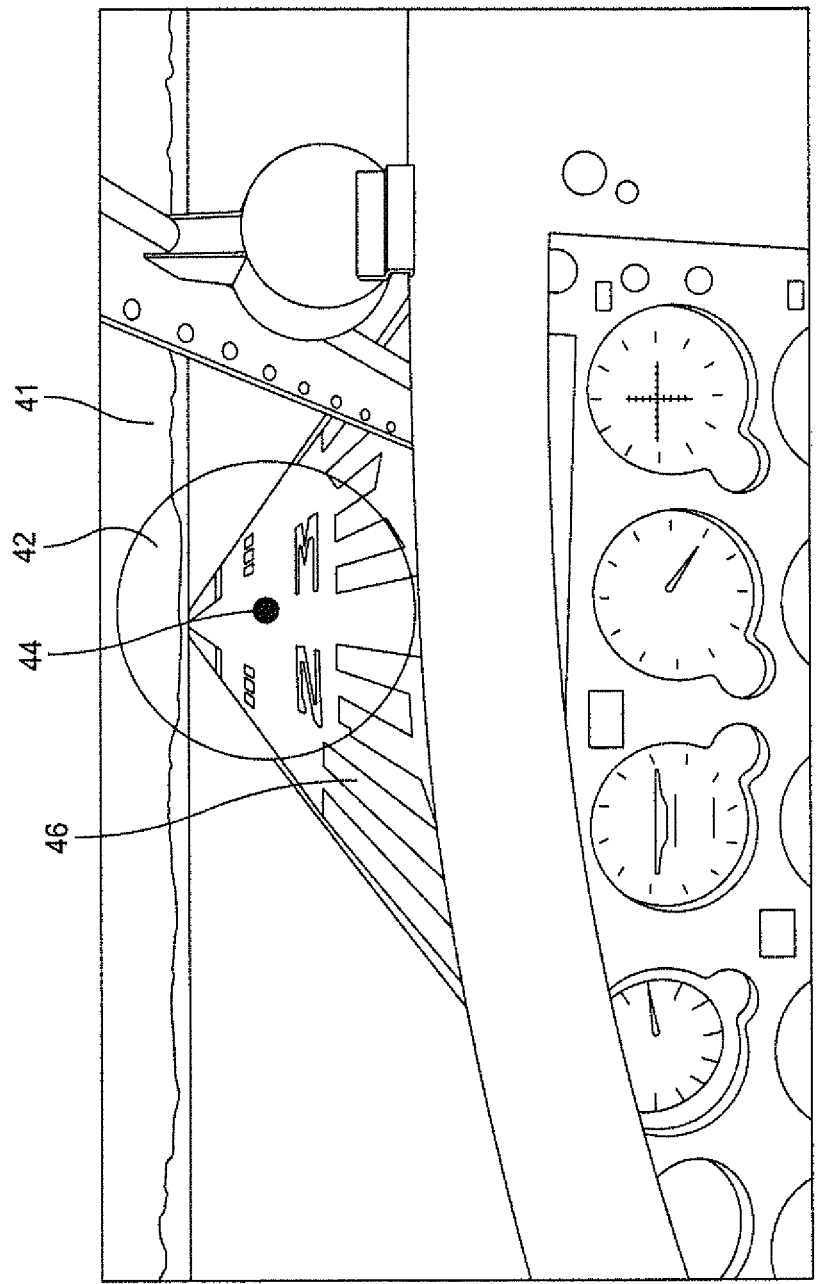
FIG. 5 is an illustration of a system according to an embodiment of the present disclosure used during a landing operation.

FIG. 5 illustrates an embodiment of the present disclosure implemented into an aircraft cockpit. In the figure, the environment as projected by the camera arrangement 42 is superimposed on the environment as viewed by the pilot 41. By providing an indicator or reticle 44 within the center of the displayed flight path image 42 projected via the camera, a pilot is provided with an accurate target or indication of the true touch-down point of the aircraft on the runway.

Figure 6A:
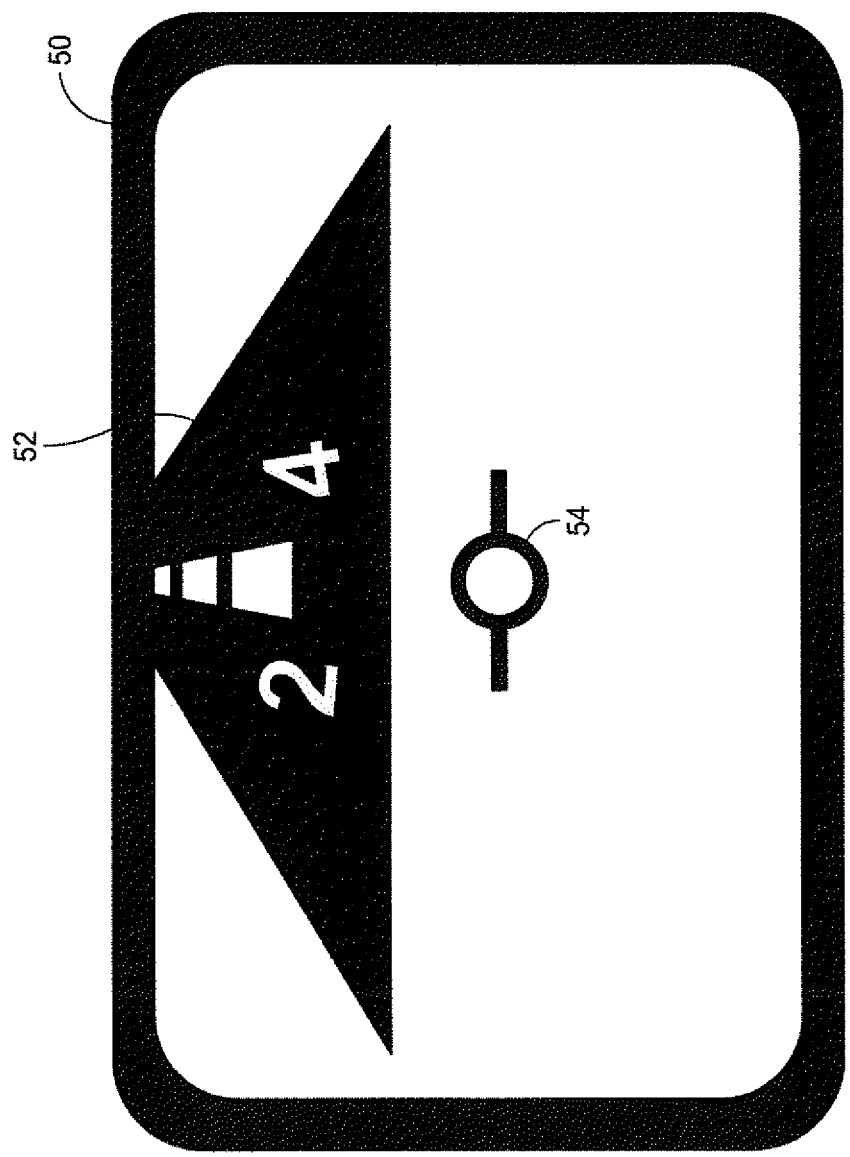
FIGS. 6A-6C are illustrations of a display as it may appear in use with embodiments of the present disclosure.
Figure 6B:
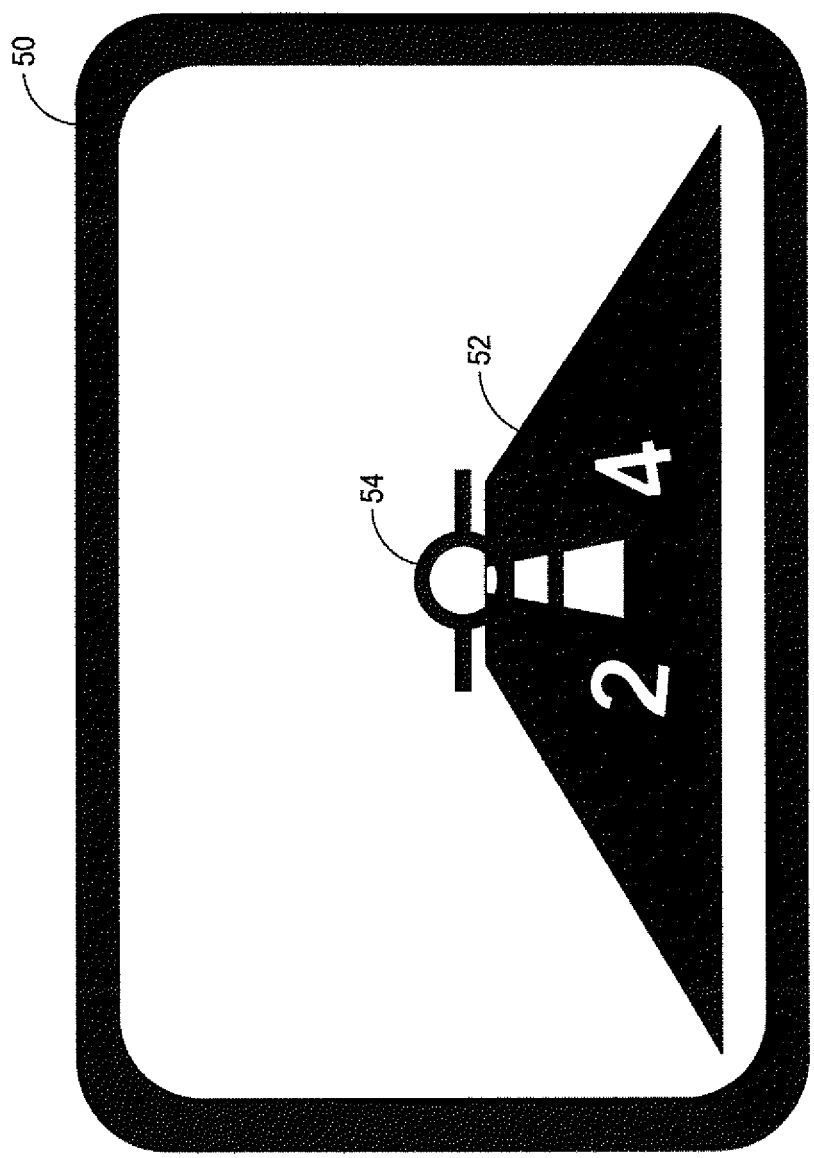
Figure 6C:
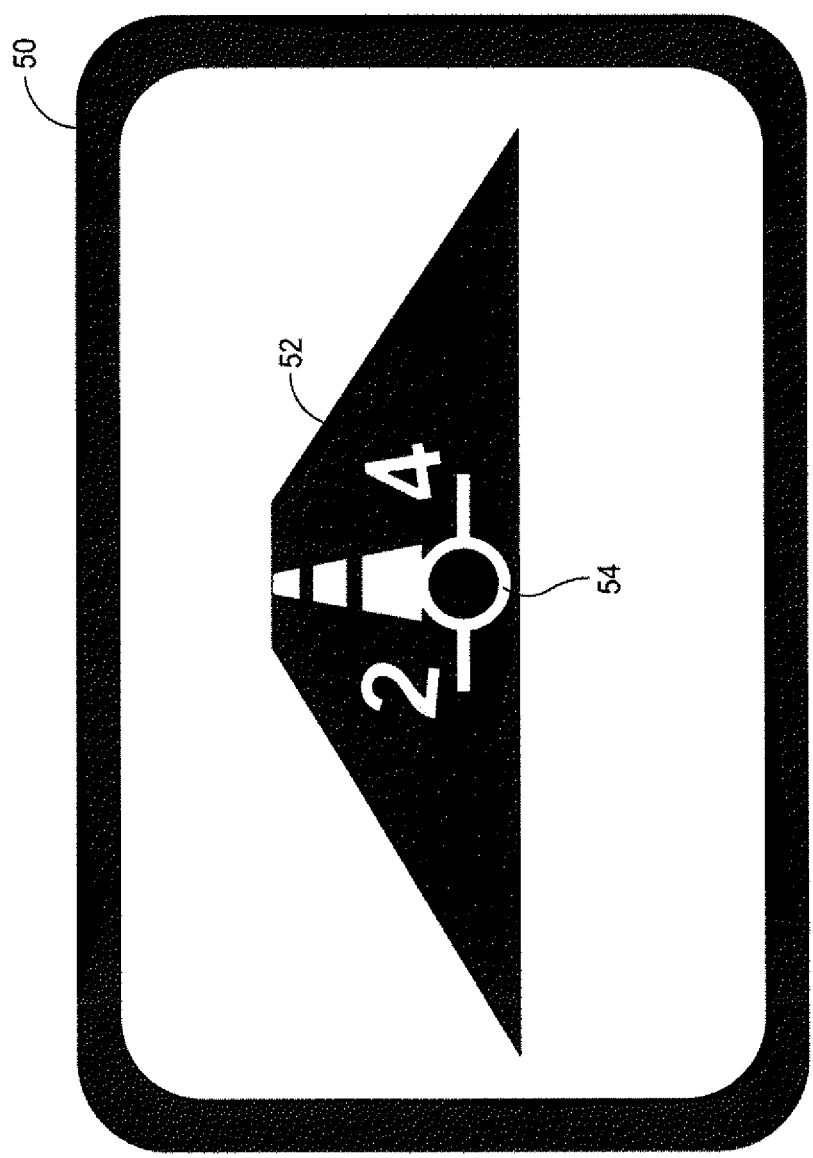

Referring generally to FIGS. 6A-6C, the functionality of systems disclosed herein as a landing aid will be further described. FIG. 6A shows a screen or display 50 used to present the output of a vane-mounted camera assembly according to embodiments described herein. As shown, an indicator 54 (e.g. a recticle corresponding to the optical center of the camera or sensor) conveys to a pilot that the aircraft's touch-down point is short of the runway (see touch-down point 17 in FIG. 1). In this instance, a pilot may, for example, alter the touch-down point by aligning indicator 54 with a target position on runway 52, such as that illustrated in FIG. 6C, by increasing the engine power setting, thereby increasing the groundspeed of the aircraft, to correct for this "short" landing scenario. Referring generally to FIG. 6B, the flight path display system according to embodiments of the present disclosure indicates that the actual touch-down point of the aircraft is "long" (see touch-down point 19 in FIG. 1). In this instance, a pilot may reduce the engine power setting, thereby decreasing the groundspeed of the aircraft, in order to alter the touch-down point of the aircraft to, for example, that indicated in FIG. 6C.

While embodiments described herein may be particularly useful for landing operations, it should also be understood that embodiments of the present disclosure may be used in various stages of a flight. For example, at any angle of attack an aircraft is capable of flying at a constant altitude with various power settings. During these conditions, the relative wind vane is always pointing at the horizon. Thus, embodiments of the present invention may also aid a user in holding a constant heading during level flight, as well as control or maintain altitude.

It should be understood that sensory arrangements exist for displaying an aircraft's angle of attack to a pilot via a visual indicator. These sensors are typically zeroed to the effective chord line of a wing or airfoil. However, these chord lines may change as, for example, leading and trailing edge flap extensions are deployed during landing operations. As such, many conventional angle of attack sensors do not remain accurate during various maneuvers. In contrast, the free vane arrangements of the present disclosure are not electrically zeroed to any aircraft parameter, such as wing cord line axis. Thus, their operation remains completely independent of, for example, flap deployment combinations, trim, pitch, and power settings, and always align with any relative wind resulting from the actual flight path of an aircraft.

It follows that embodiments of the present disclosure may provide a significant advantage over, for example, a system utilizing a moveable camera which is steered (e.g. servo-controlled) according to an output of an angle of attack sensor. As set forth above, as these angle of attack sensors are normally zeroed to a predetermined chord line of a wing, alterations in, for example wing flap configuration, will result in a different chord line, thereby deleteriously affecting the accuracy of the angle of attack sensor. Embodiments of the present invention may avoid this zeroing error, in addition to avoiding the need for correction methods for these errors, by providing a camera which is continuously and accurately aimed in the direction of the flight path of the aircraft.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A sensor assembly for conveying flight path information comprising:
   a frame configured to attach to an aircraft;
   a vane pivotally attached to the frame, the vane having a pointing axis, and configured to align the pointing axis with a vector indicative of the direction of the flight path of the aircraft according to a relative wind vector acting thereon; and
   an optical sensor mounted to the vane, the optical sensor having a sensing axis aligned with the direction of the pointing axis of the vane such that the sensing axis is thereby aligned with the relative wind vector, and
   wherein the optical sensor is configured to output a signal indicative of a visual indication of the flight path of the aircraft along the optical sensing axis.

2. The assembly of claim 1, wherein the vane has a housing, and wherein the optical sensor is arranged within the housing.

3. The assembly of claim 2, wherein the housing is pivotally mounted to the frame.

4. The assembly of claim 2, wherein the housing comprises a generally cylindrical body, and wherein the optical sensor has its sensing axis arranged coaxially with the housing.

5. The assembly of claim 2, further comprising a collar slidably mounted to the housing and pivotally mounted to the frame for allowing the center of gravity of the housing to be aligned with a pivoting axis of the vane.

6. The assembly of claim 1, wherein the optical sensor comprises a video camera.

7. The assembly of claim 1, wherein the sensor assembly further comprises a transmitter.

8. The assembly of claim 1, wherein the sensing axis of the optical sensor is oriented generally parallel to the pointing axis of the vane.

9. The assembly of claim 8, wherein the sensing axis is orthogonal to the pivoting axis of the vane.

10. The assembly of claim 1, wherein the sensing axis of the optical sensor is oriented generally coaxially with the pointing axis of the vane.

11. The assembly of claim 10, wherein the frame comprises at least one elongated arm member having a first end configured to attach proximate to a wing of the aircraft, and a second end, wherein the vane is pivotally attached to the second end of the at least one elongated arm member.

12. A system for displaying the flight path of an aircraft comprising:
- a vane assembly pivotally mounted to the aircraft, the vane assembly having a pointing axis, and configured to align the pointing axis with a vector indicative of the direction of the flight path of the aircraft according to a relative wind vector acting thereon;
- an optical sensor mounted to the vane assembly, the optical sensor having a sensing axis aligned with the direction of the pointing axis of the vane assembly such that the sensing axis is thereby aligned with the relative wind vector, the optical sensor configured to output a signal indicative of a visual indication of the flight path of the aircraft along the optical sensing axis; and
- a display device responsive to the output signal of the optical sensor for displaying a visual indication of the flight path of the aircraft.

13. The system of claim 12, further comprising a transmitter responsive to the output of the optical sensor.

14. The system of claim 13, further comprising a receiver operatively connected to the display device and responsive to the transmitter.

15. The system of claim 12, wherein the optical sensor has its sensing axis collimated with the pointing axis of the vane assembly.

16. The system of claim 12, wherein a sensing axis of the optical sensor is generally orthogonal with respect to the pivoting axis of the vane assembly.

17. The system of claim 12, wherein the vane assembly has a housing, and wherein the optical sensor is arranged within the housing.

18. The system of claim 12, further comprising a mounting frame for pivotally mounting the vane assembly to the aircraft.

19. The system of claim 18, wherein the vane assembly is slidably mounted with respect to the frame.

20. The system of claim 12, wherein the display device comprises at least one of a video display and a video projector.

* * * * *